March 4, 1924.

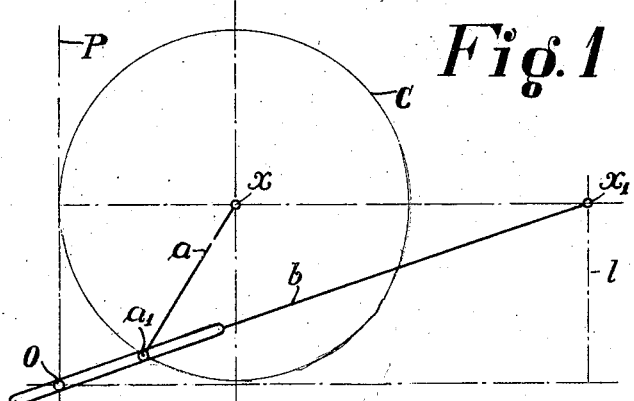
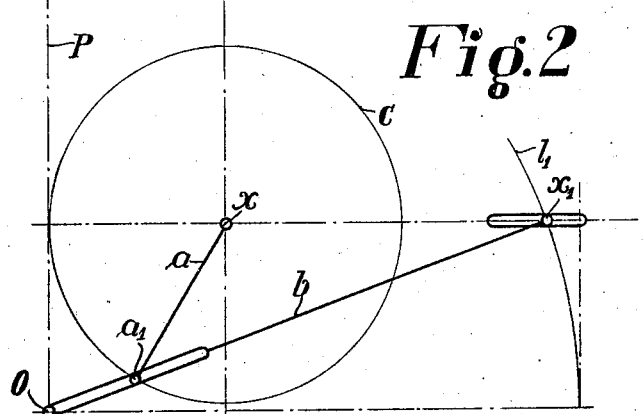
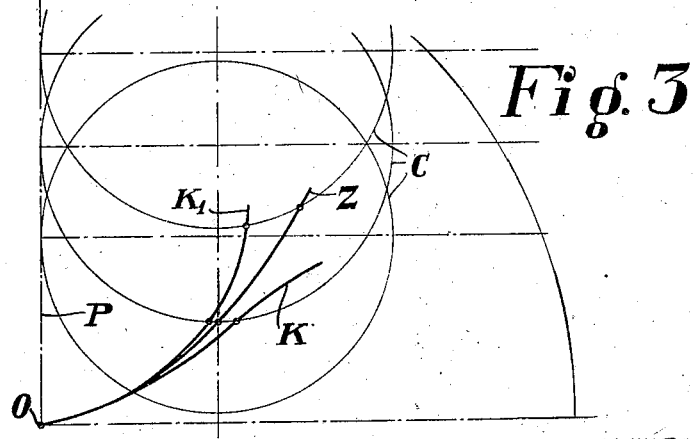

S. G. WINGQUIST 1,485,900

LINK SYSTEM FOR CONTROLLING ROLLING MOVEMENTS

Filed April 13, 1921  3 Sheets-Sheet 2

INVENTOR
S. G. Wingquist
BY
Rogers, Kennedy Campbell
ATTORNEYS.

March 4, 1924. 1,485,900
S. G. WINGQUIST
LINK SYSTEM FOR CONTROLLING ROLLING MOVEMENTS
Filed April 13, 1921 3 Sheets-Sheet 3

INVENTOR
S. G. Wingquist
BY
Rogers, Kennedy Campbell
ATTORNEYS.

Patented Mar. 4, 1924.

1,485,900

UNITED STATES PATENT OFFICE.

SVEN GUSTAF WINGQUIST, OF GOTTENBORG, SWEDEN, ASSIGNOR TO AKTIEBOLAGET SVENSKA KULLAGERFABRIKEN, OF GOTTENBORG, SWEDEN, A CORPORATION OF SWEDEN.

LINK SYSTEM FOR CONTROLLING ROLLING MOVEMENTS.

Application filed April 13, 1921. Serial No. 461,157.

*To all whom it may concern:*

Be it known that I, SVEN GUSTAF WINGQUIST, a subject of the King of Sweden, residing at Gottenborg, in the Kingdom of Sweden, have invented a new and useful Improved Link System for Controlling Rolling Movements, of which the following is a specification.

The object of the present invention is to produce a link system by means of which a body of revolution, for instance a cylinder, may be caused to perform a rolling movement with a minimum of sliding, whereby for large angles of rolling, the movement of the cylinder will for all practical purposes act with a true rolling effect; and with this and other objects in view, the invention consists of the construction and arrangement of parts fully set forth in the specification to follow, and the novel features of which will be pointed out in the appended claims.

In the accompanying drawings:

Fig. 1 is a diagrammatic view of a link system of well known form for controlling rolling movements.

Fig. 2 is a diagrammatic view of a link system embodying my invention.

Fig. 3 is a diagrammatic view to illustrate a comparison of the actions of the link systems of Figs. 1 and 2.

Figure 4:
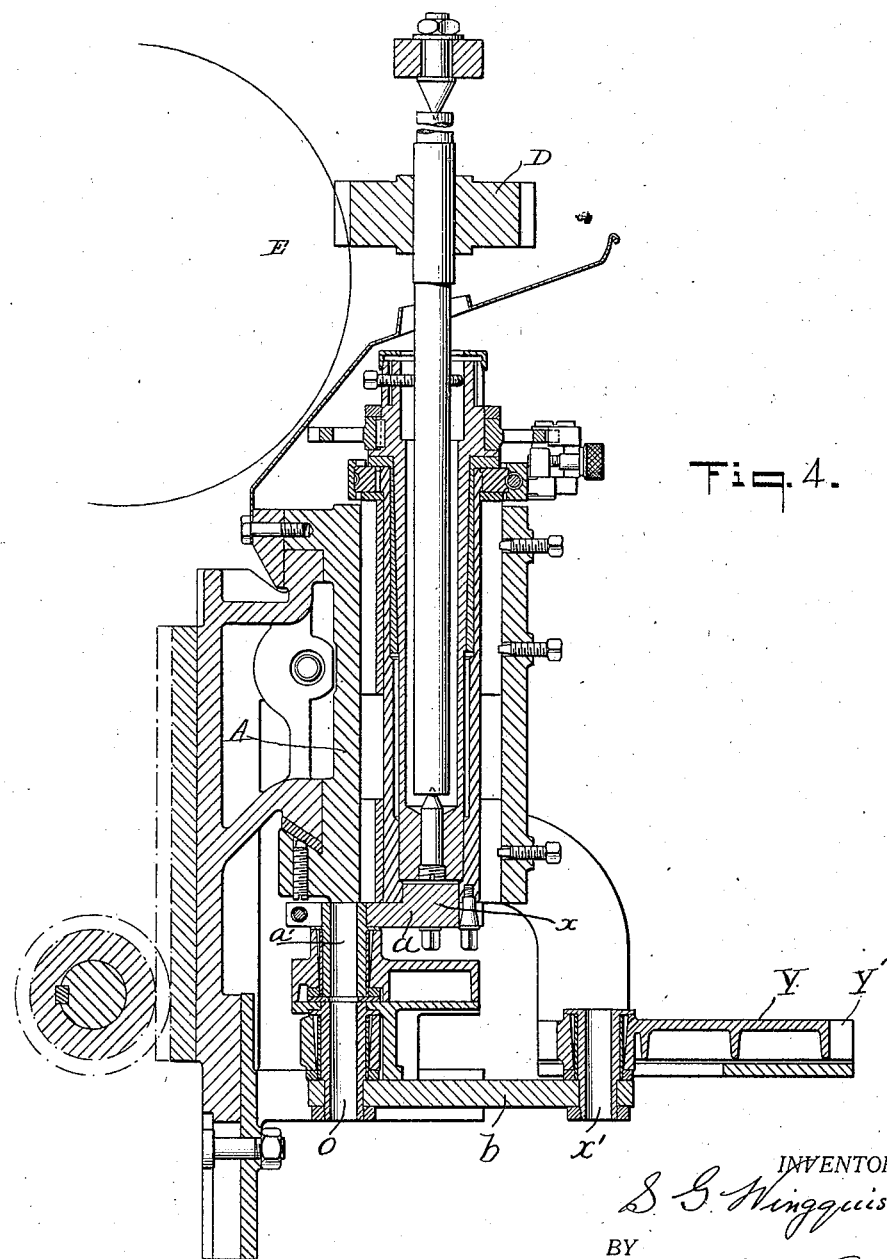
Fig. 4 is a vertical sectional elevation of a machine having my improved link system incorporated therein.

Referring to the drawings:

The well known link system shown diagrammatically in Fig. 1 by means of which the cylinder C shall be caused to roll and slide upon the plane surface P, includes a link or crank $a$ rigidly attached to the shaft $x$ integral with the cylinder and having a length equal to the length of the radius of the cylinder. The said link system further includes an auxiliary link $b$ pivotally and slidably connected to the free end $a_1$ of the link $a$ and having its one end pivotally and slidably mounted at the point O where the rolling movement begins, the other end of the said auxiliary link being pivotally connected with a shaft $x_1$, situated at a distance therefrom corresponding to twice the radius of the cylinder C. In the machine in which these parts would be incorporated, the shaft $x'$ would be mounted in a slide (not shown) carrying the shaft $x$ in the manner known to those skilled in the art so that the shaft $x'$ and shaft $x$ would be sustained in fixed relations to each other. The rolling movement is accomplished in the known way by rectilineally displacing the slide carrying the two relatively stationary shafts $x$ and $x_1$ in the direction of rolling at one side or both of the central position of the link system, in which position the links $a$ and $b$ will cover one another and the end point $a_1$ of the link $a$ will coincide with the point O where the rolling movement begins. An essential feature of this link system involves that the length of the auxiliary link $b$ between the controlling shafts O and $x_1$ may be varied. Another feature involves that the movable controlling shaft $x_1$ describes a retilinear path $l$ in the rectilinear movement of the slide.

The link system according to this invention as shown in Fig. 2, likewise involves a link or crank $a$ rigidly connected to the shaft $x$, which shaft is integral with the cylinder C and an auxiliary link $b$ pivotally and slidably connected to the end point $a_1$ of said link $a$. At one end the link $b$ is fixed to a shaft O which is pivotally mounted in the machine frame as shown in Fig. 4, while at its opposite end the link carries a shaft $x'$ movable with the slide A carrying the shaft $x$, so that the length of the link $b$ when measured between controlling shafts O and $x'$ remains constant. In the movement of the slide A, the controlling shaft $x'$ describes an arc-shaped path $l'$ due to the fact that link $b$ has a pivotal support by means of the shaft O in the machine frame. This construction and operation of the parts brings about an improvement as to the rolling movement, as will more clearly appear from Fig. 3.

Figure 5:
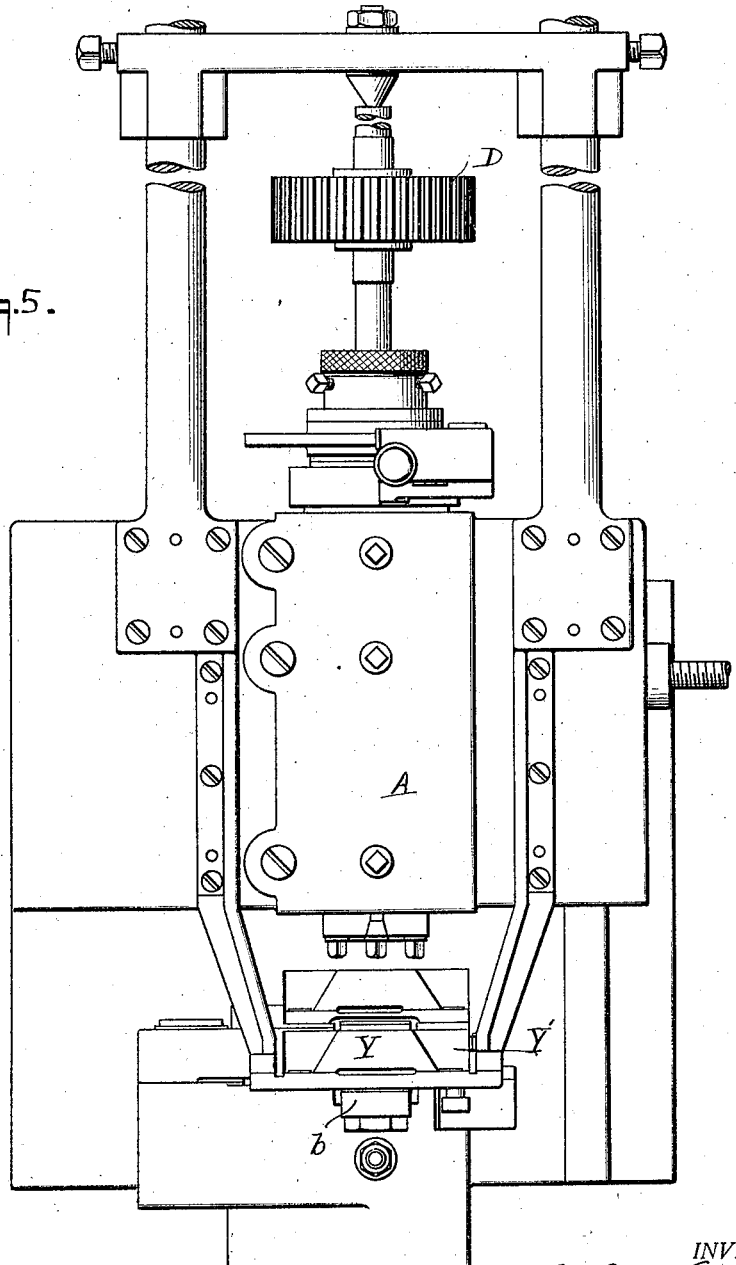
Fig. 5 is a front elevation of the same.

With reference to Fig. 3, the reference character Z indicates the cycloid which would be described by a given point of the periphery of the cylinder C, provided the movement of the cylinder on the plane surface P were a pure rolling movement. If, on the other hand, the rolling movement be accomplished by means of the link system shown in Fig. 1, the said point of the periphery of the cylinder will describe a curve K, whereas, if the rolling movement be controlled by the link system according to this invention, as shown in Fig. 2, the said point will describe a curve $K_1$. As will appear from a comparison between the curves shown, the curve $K_1$ corresponds more closely to the ideal cycloid Z along a considerably greater length than is the case with the curve K. Thus, it is understood that the link system shown in Fig. 2 will bring about a better rolling action, especially for large angles of rolling, than that obtained by the link system shown in Fig. 1. From Fig. 3 it appears, moreover, that the two curves K and $K_1$ are situated at opposite sides of the ideal cycloid Z, the movable controlling shaft $x_1$ of the auxiliary link b describing in the one case a straight-lined path l, Fig. 1, and in the other case an arc-shaped path $l_1$ having its centre in the point O where the rolling movement begins, as shown in Fig. 2. From this it is evident that if the movable controlling shaft $x_1$ of the auxiliary link b be caused to describe an arc situated between the straight line l and the arc $l_1$, a given point of the periphery of the cylinder C will describe a curve corresponding more closely to the ideal cycloid Z than is the case with any of the curves K and $K_1$. In Figs. 4 and 5 a machine is illustrated in which the above described link system is incorporated. Here it will be seen that the slide A before referred to has mounted in it the shaft or stud x to which is rigidly connected the link a carrying the terminal portion or pin a'. The shaft O before alluded to is pivotally mounted in the machine frame and is connected with one end of the link b which at its opposite end carries the shaft x' carrying a slide Y movable in guideways Y' carried by the slide A, the stud a' and link b having a pivotal and sliding connection with each other as hereinbefore described. In the operation of this mechanism, by the rectilinear movement of the slide A, the link b, due to the connection link a therewith, will be swung on its axis O in which movement the work blank D will be shifted bodily with reference to the grinder E and at the same time will be given a rolling motion during which action the shaft x' of link b will describe the arc-shaped path l' shown in Fig. 2.

While the link system has been described above as used for obtaining rolling and sliding movements of a cylinder on a plane surface, it should be understood that it is not limited to such a use but may be used for rolling and sliding a cylinder on or within another cylinder or for rolling and sliding a cone on a plane surface or on another cone.

The link system is especially applicable to machines operating on the principle of rolling or on any other principle for generating toothed wheels in which the wheel blank shall be given a rolling movement relatively to the tool.

What I claim is:—

1. A link system for imparting a rolling and sliding movement to a body of revolution, comprising in combination a crank rigidly connected to the axis of the body of revolution and having a length equal to the radius of the said body of revolution, an auxiliary link pivotally and slidably connected to the free end of said crank, a stationary controlling axis and a movable controlling axis for said auxiliary link, the auxiliary link having a constant length between the said controlling axes as and for the purpose set forth.

2. A link system for imparting a rolling and sliding movement to a body of revolution, comprising in combination a crank rigidly connected to the axis of the body of revolution and having a length equal to the radius of the said body of revolution, an auxiliary link pivotally and slidably connected to the free end of said crank, a stationary controlling axis for said auxiliary link, situated at the point where the rolling movement is adapted to begin and a movable controlling axis for said auxiliary link, the auxiliary link having a constant length between the said controlling axes as and for the purpose set forth.

3. A link system for imparting a rolling and sliding movement to a body of revolution, comprising in combination a crank rigidly connected to the axis of the body of revolution and having a length equal to the radius of the said body of revolution, an auxiliary link pivotally and slidably connected to the free end of said crank, and having a length approximately equal to thrice the radius of the said body of revolution, a stationary controlling axis and a movable controlling axis for said auxiliary link, the auxiliary link having a constant length between the said controlling axes as and for the purpose set forth.

In testimony whereof I have signed my name.

SVEN GUSTAF WINGQUIST.